(12) United States Patent
Mazza et al.

(10) Patent No.: US 10,673,311 B2
(45) Date of Patent: Jun. 2, 2020

(54) ELECTRIC MOTOR WITH LOW TORQUE RIPPLE

(71) Applicant: ABB Schweiz AG, Baden (CH)

(72) Inventors: Lorenzo Mazza, Cary, NC (US); Rajib Mikail, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 329 days.

(21) Appl. No.: 15/683,035

(22) Filed: Aug. 22, 2017

(65) Prior Publication Data

US 2019/0068036 A1 Feb. 28, 2019

(51) Int. Cl.
| | | |
|---|---|---|
| *H02K 19/10* | (2006.01) |
| *H02K 1/16* | (2006.01) |
| *H02K 1/26* | (2006.01) |
| *H02K 1/24* | (2006.01) |
| *H02K 1/14* | (2006.01) |
| *H02K 3/18* | (2006.01) |
| *H02K 1/27* | (2006.01) |

(52) U.S. Cl.
CPC ............ *H02K 19/10* (2013.01); *H02K 1/146* (2013.01); *H02K 1/16* (2013.01); *H02K 1/165* (2013.01); *H02K 1/246* (2013.01); *H02K 1/26* (2013.01); *H02K 1/2766* (2013.01); *H02K 3/18* (2013.01); *H02K 19/103* (2013.01)

(58) Field of Classification Search
CPC .......... H02K 19/10; H02K 1/146; H02K 1/16; H02K 1/246; H02K 1/26; H02K 3/18
See application file for complete search history.

(56) References Cited

U.S. PATENT DOCUMENTS

| | | | |
|---|---|---|---|
| 3,950,664 A * | 4/1976 | Andreica | H02K 3/28 310/203 |
| 5,818,140 A | 10/1998 | Vagati | |
| 2010/0026008 A1* | 2/2010 | Sawahata | H02K 1/165 290/55 |
| 2012/0062053 A1 | 3/2012 | Moghaddam et al. | |
| 2014/0167547 A1* | 6/2014 | Hao | H02K 21/16 310/156.01 |

FOREIGN PATENT DOCUMENTS

KR 1020100080653 1/2009

OTHER PUBLICATIONS

International Searching Authority (US), International Search Report and Written Opinion dated Nov. 21, 2018; Application No. PCT/US18/00336; 9 pgs.

Marco Palmieri, Maurizio Perta, Francesco Cupertino, Effect of the Numbers of Slots and Barriers on the Optimal Design of Synchronous Reluctance Machines, May 22-24, 2014, 9 pgs., Piscataway, New Jersey.

(Continued)

*Primary Examiner* — Jue Zhang
(74) *Attorney, Agent, or Firm* — Taft Stettinius & Hollister LLP; J. Bruce Schelkopf

(57) ABSTRACT

An electrical motor is provided to reduce torque ripple. Torque ripple is a variation in torque output as the rotor rotates. The motor has a stator and a rotor. The stator slots are used for windings. The rotor slots define a plurality of poles. The number of slots in the stator are equal to the number of slots in the rotor.

15 Claims, 4 Drawing Sheets

(56) References Cited

OTHER PUBLICATIONS

K. Wang, Q. Zhu, G. Ombach, M. Koch, S. Zhang, J. Xu, Optimal Slot/Pole and Flux-Banrier Layer Number Combinations for Synchronous Reluctance Machines, Mar. 27-30, 2013, 8 pgs.; Piscataway, New Jersey.
Volodymyr Bilyi, Dieter Gerling, Dmytro Bilyi, Flux Barrier Design Method for Torque Ripple Reduction in Synchronous Reluctance Machines, Jun. 1-4, 2016, 6 pgs., Piscataway, New Jersey.
T. Lange, B. Kerdsup, C. Weiss, R.W. De Donker, Torque Ripple Reduction in Reluctance Synchronous Machines Using an Asymmetric Rotor Structure, Apr. 8-10, 2014, 5 pgs., Piscataway, New Jersey.
X.B. Bomela, M.J. Kamper, Effect of Stator Chording and Rotor Skewing on Performance of Reluctance Synchronous Machine, IEEE Transactions on Industry Applications, vol. 38, No. 1, Jan./Feb. 2002, 10 pgs., Piscataway, New Jersey.
A. Vagati, M. Pastorelli, G. Franceschini, C. Petrache, Design of Low-Torque-Ripple Synchronous Reluctance Motors, Oct. 5-9, 1997, 8 pgs., Piscataway, New Jersey.

\* cited by examiner

Table 1

| Slots/Phase | Phase | Slot | Pole | Slots/Pole |
|---|---|---|---|---|
| 2.5 | A | 1 | 1 | |
| | A | 2 | 1 | |
| | B/A | 3 | 1 | 6.5 |
| 2 | B | 4 | 1 | |
| | B/C | 5 | 1 | |
| 2 | C | 6 | 1 | |
| | A/C | 7 | 1/2 | |
| 2.5 | A | 8 | 2 | |
| | A | 9 | 2 | |
| | B | 10 | 2 | |
| 2.5 | B | 11 | 2 | 7 |
| | B/C | 12 | 2 | |
| 2 | C | 13 | 2 | |
| | A/C | 14 | 2/3 | |
| 2 | A | 15 | 3 | |
| | B/A | 16 | 3 | |
| 2.5 | B | 17 | 3 | 7 |
| | B | 18 | 3 | |
| | C | 19 | 3 | |
| 2.5 | C | 20 | 3 | |
| | A/C | 21 | 3/4 | |
| 2 | A | 22 | 4 | |
| | B/A | 23 | 4 | |
| 2 | B | 24 | 4 | 6.5 |
| | B/C | 25 | 4 | |
| 2.5 | C | 26 | 4 | |
| | C | 27 | 4 | |

FIG. 4

ELECTRIC MOTOR WITH LOW TORQUE RIPPLE

BACKGROUND

The present inventions relate generally to electric motors, and more particularly, to a motor with reduced torque ripple.

One type of electric motor is known as a synchronous reluctance motor. In a synchronous electric motor, the rotor rotates at a speed that is synchronized with the frequency of an AC power source (i.e., the field rotation of the stator). Induction motors, by contrast, are asynchronous since the rotor rotates at a slower speed than the stator field. A synchronous reluctance motor has pole regions of high magnetic permeance and insulated regions of low magnetic permeance. As the stator field rotates, the pole regions of the rotor are attracted by the stator field in order to rotate the rotor. A synchronous permanent magnet motor includes magnets in the rotor that are attracted to and/or repelled by the stator field to cause the rotor to rotate.

Torque ripple occurs in electrical motors when the design of the motor results in torque variations as the rotor makes a single revolution. Torque ripple may be caused by various factors related to the design of a motor. In general, torque ripple is produced by the changing alignment and misalignment of the stator and rotor as the rotor rotates through one revolution. A large variation in torque output as the motor rotates (i.e., torque ripple) is undesirable because it results in vibration and noise among other problems. Thus, electrical motors with low torque ripple are desirable.

SUMMARY

An improved electrical motor is described. The electrical motor has a stator and a rotor. The stator and rotor each have a number of slots. The number of slots in the stator is unequal to the number of slots in the rotor. One advantage of the motor is that torque ripple may be reduced.

BRIEF DESCRIPTION OF SEVERAL VIEWS OF THE DRAWINGS

The invention may be more fully understood by reading the following description in conjunction with the drawings, in which:

FIG. 4 is a table of phases, slots and poles.

DETAILED DESCRIPTION

Figure 1:
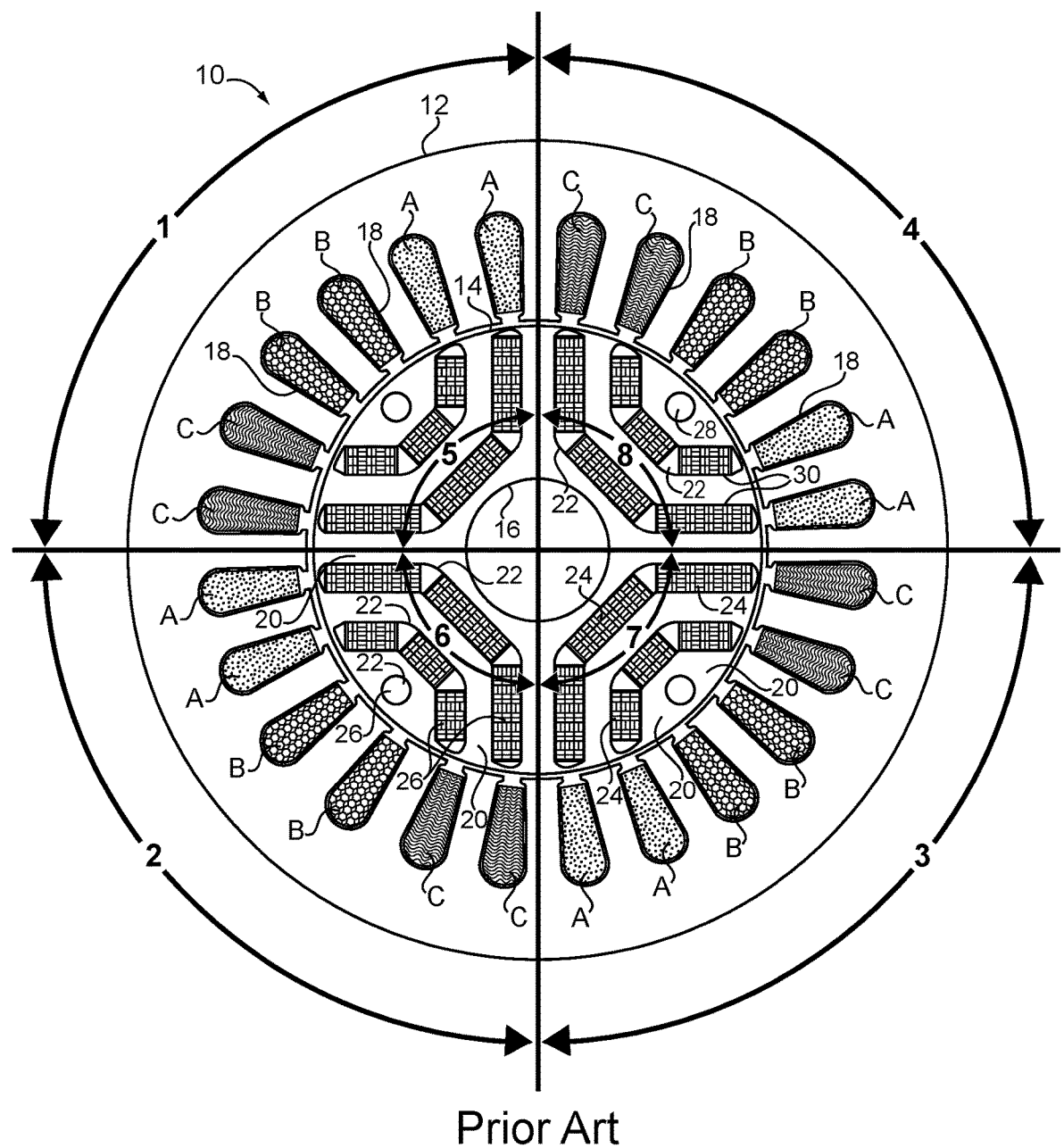
FIG. 1 is a schematic view of a conventional reluctance motor.

Referring now to the figures, and particularly FIG. 1, a conventional motor 10 is shown. The motor 10 includes a stator 12 and a rotor 14. The rotor 14 may be provided with an axial hole 16 for a rotor shaft. As is well understood by those in the art, electric AC current is fed to one or more windings A, B, C in the stator 12 which generates a rotating magnetic field. The rotating magnetic field is directed at the rotor 14 and causes the rotor 14 to rotate in response thereto.

In FIG. 1, the motor 10 is a three-phase motor with three phase windings A, B, C. The windings A, B, C are wound through a number of slots 18 in the stator 12. The windings A, B, C are arranged in a pattern that forms four stator poles 1, 2, 3, 4. As can be seen in FIG. 1, the number of stator slots is 24, which results in a ratio of stator slots (24) to stator poles (4) and number of electrical phases (3) being 2 (24/(4*3)). Notably, the ratio is an integer. Further, as illustrated in FIG. 1, the phase windings A, B, C and the pole windings 1, 2, 3, 4 of the stator 12 are symmetrical around the stator 12.

The rotor 14 is formed of a series of magnetically permeable segments 20 and insulated regions 22 between the segments 20. The insulated regions 22 form slots 26 separating the segments 20. As shown in FIG. 1, permanent magnets 24 may also be provided in the insulated regions 22 if desired to affect the properties of the rotor 14. In the embodiment of FIG. 1, the segments 20 and slots 26 are arranged in a pattern that forms four rotor poles 5, 6, 7, 8. The number of rotor slots 26 is 24. It is pointed out that the holes 28 in the center of each pole 5, 6, 7, 8 count as two slots 26 each, since the holes 28 are each generally aligned with two corresponding stator slots 18. Thus, the number of rotor slots 26 is counted as 16 elongated slots 30 plus 4 center holes 28 times 2, which equals 24 total rotor slots 26. Therefore, the ratio of rotor slots (24) to rotor poles (4) and electrical phases (3) is 2 (24/(4*3)). Notably, the ratio is an integer, and in the embodiment of FIG. 1, is equal to the stator ratio.

A problem with the conventional design of FIG. 1 is that the motor 10 will experience torque ripple as the rotor 14 rotates through each revolution. That is, the rotor 14 will rotate through angular locations where the motor torque is high and angular locations where the motor torque is low. For example, in FIG. 1, the stator poles 1, 2, 3, 4 and rotor poles 5, 6, 7, 8 are shown aligned with each other. However, as the rotor 14 rotates, the rotor 14 and stator 34 experience various degrees of alignment and misalignment with each other, which results in pulses of output torque between high and low torque values. Thus, as understood in the art, torque ripple refers to the variation in torque output due to the design of the motor 10 that occurs as the rotor 14 rotates.

Figure 2:
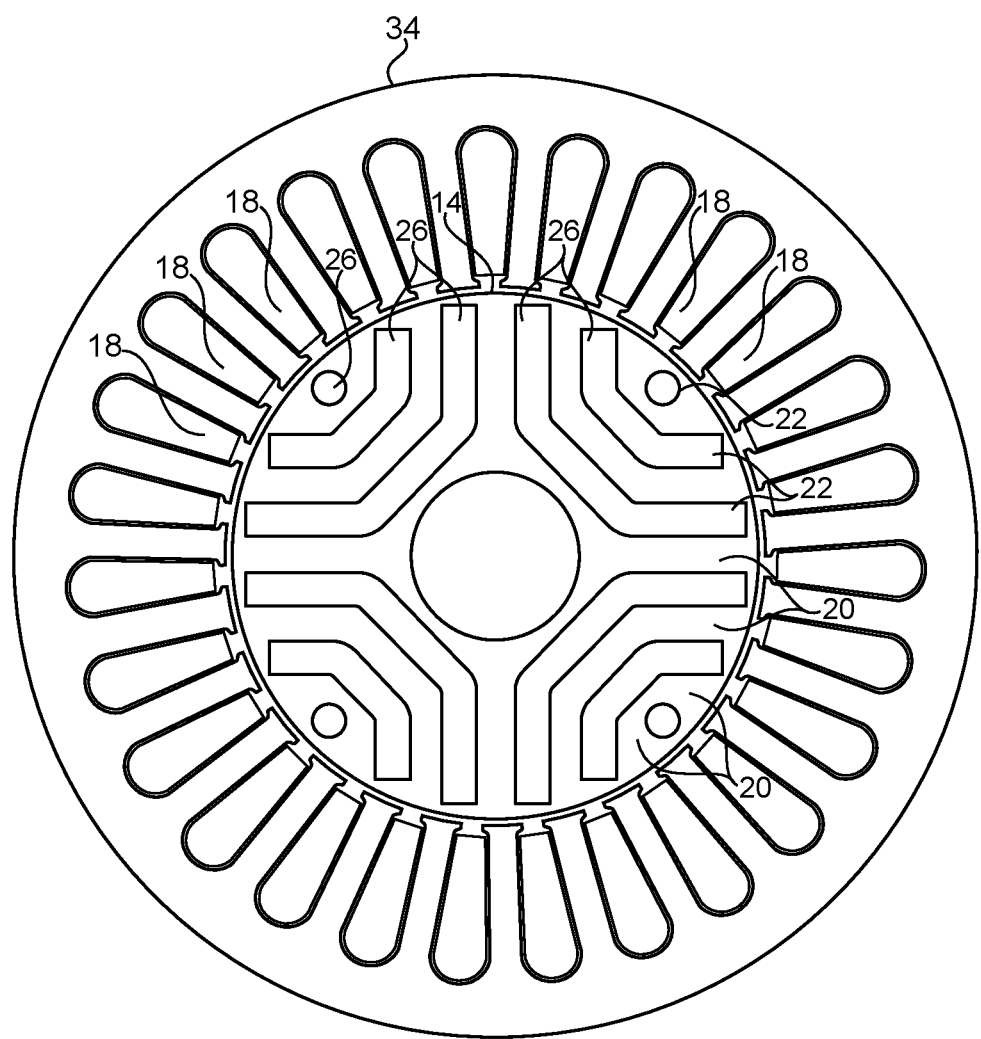
FIG. 2 is a schematic view of a stator and a rotor for a reluctance motor.

In FIG. 2, an improved stator 34 and rotor 14 design is shown. In this arrangement, the stator 34 has 27 slots, and the rotor 14 has 24 slots. Thus, like the embodiment of FIG. 1, the rotor 14 has a ratio of rotor slots 26 to rotor poles 5, 6, 7, 8 and phases A, B, C of 2. However, in contrast to FIG. 1, the stator 34 has a ratio of stator slots (27) to stator poles (4) and phases (3) of 2.25 (27/(4*3)). Thus, the rotor ratio is an integer, and the stator ratio is a non-integer.

Figure 3:
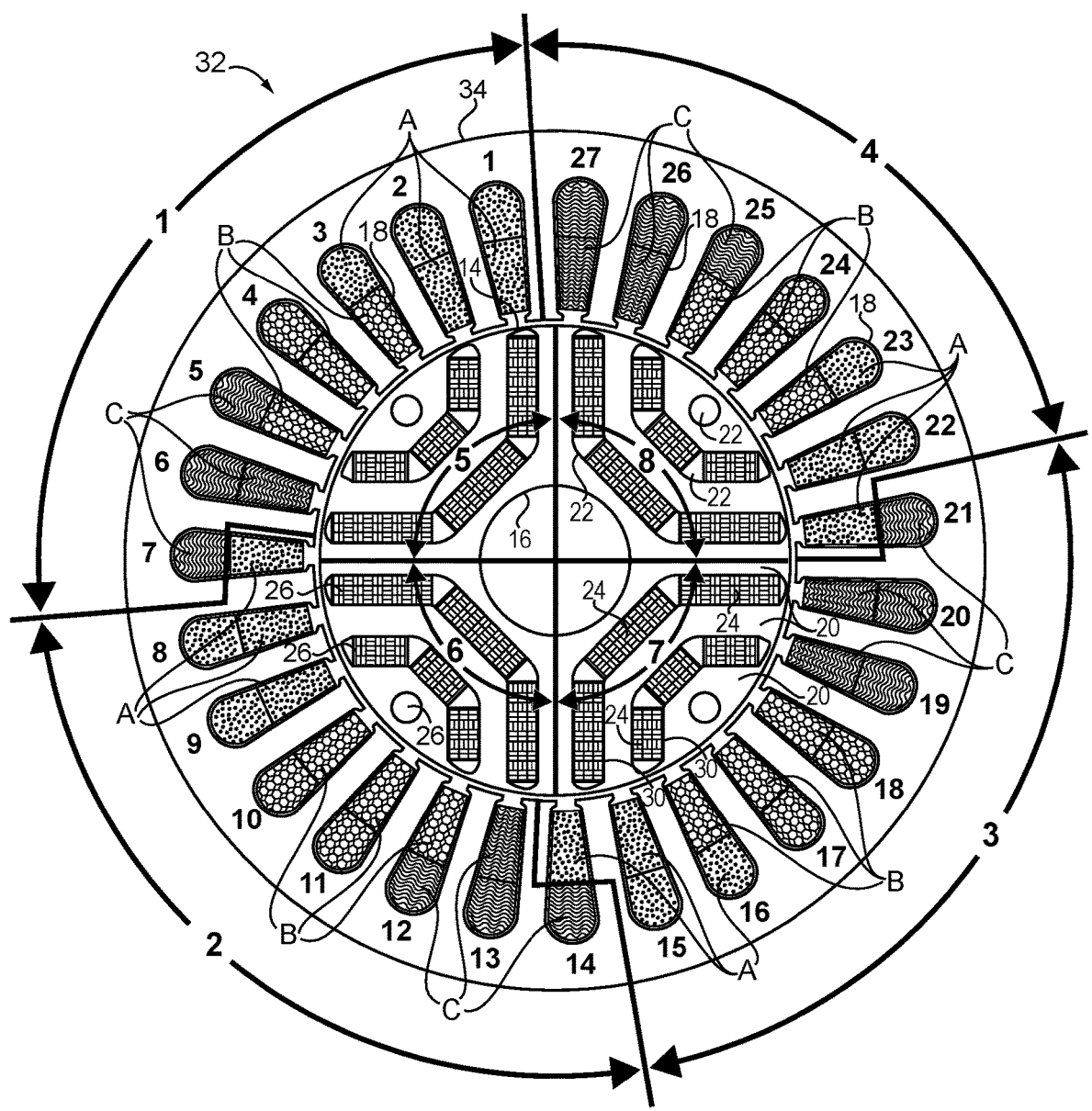
FIG. 3 is a schematic view of the reluctance motor of FIG. 2.

In FIG. 3, the stator 34 and rotor 14 of FIG. 2 are shown in a motor 32 with windings. The windings may be considered phase windings A, B, C (i.e., windings of a common phase) or pole windings 1, 2, 3, 4 (i.e., windings in a single pole). In FIG. 3, the slots 18 have been numbered using the slot numbers of FIG. 4. The poles 1, 2, 3, 4 and phases A, B, C have also been labeled according to FIG. 4. In the particular embodiment of FIG. 3, the stator 34 and the rotor 14 each have four poles 1-4, 5-8. Preferably, the stator 34 and the rotor 14 have the same number of poles, although the number of poles may be different than the four poles shown in FIG. 3. The motor 32 in FIG. 3 is also preferably a three-phase motor. Other variations are also possible with different numbers of stator poles and slots and rotor poles and slots. For example, although the stator 34 is shown with 27 slots, other numbers of slots 18 are possible where the ratio of stator slots 18 to poles 1, 2, 3, 4 and phases A, B, C is a non-integer.

An advantage of the described motor 32 is that torque ripple may be significantly reduced. In particular, the torque ripple of the motor 32 in FIG. 3 is noticeably less than the torque ripple of the motor 10 in FIG. 1. Thus, vibration and noise is reduced. One reason for the reduced torque ripple is that common harmonics that occur in many conventional motor designs are avoided in the described motors 32. While this has the beneficial result of reduced torque ripple, the stator windings may not be implemented in a conventional fashion. That is, in the conventional motor 10 of FIG. 1, the stator phase windings A, B, C and stator pole windings 1, 2, 3, 4 are both symmetrical. That is, each phase winding A, B, C occupies two adjacent slots 18, and each pole winding 1, 2, 3, 4 occupies six slots 18, with the arrangement of phase windings A, B, C being the same in each of the four poles 1, 2, 3, 4.

By contrast, as shown in FIG. 3 and tabulated in FIG. 4, the phase windings A, B, C and/or pole windings 1, 2, 3, 4 in the improved motor 32 are unsymmetrical. For example, the pole windings of poles 1 and 4 occupy 6½ slots 18, whereas the pole windings of poles 2 and 3 occupy 7 slots 18. The phase windings A, B, C are also unsymmetrical. For example, phase A occupies 2 slots 18 in poles 3 and 4, whereas phase A occupies 2½ slots 18 in poles 1 and 2. The arrangements of phase windings A, B, C in each pole 1, 2, 3, 4 are also unsymmetrical with respect to each other. In order to achieve the desired stator winding arrangement, it may be desirable to share individual slots 18 with different phases A, B, C and/or pole windings 1, 2, 3, 4 as shown in FIG. 3.

In FIG. 3, the rotor 14 is shown as a reluctance rotor 14 with permanent magnets 24 disposed in the insulated regions 22, or slots 26. However, the motor 32 could also be implemented as a reluctance motor without permanent magnets. Preferably, the motor 32 is a synchronous motor 32. Although various structures are possible for the stator 34 and the rotor 14, it is also preferable for the stator 34 and the rotor 14 to each be made of a stack of thin laminations of a magnetically permeable material, such as silicon steel.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An electrical reluctance motor, comprising:
  a stator comprising a number of stator slots $S_s$, a number of stator poles $P_s$, and a number of electrical phases Ph, wherein the number of electrical phases Ph is three, the stator receiving an AC current from a power source;
  a rotor comprising a number of rotor slots $S_r$ and a number of rotor poles $P_r$, the rotor providing a torque output;
  wherein a ratio of the number of stator slots $S_s$ to the number of stator poles $P_s$ and the number of electrical phases ($S_s/(P_s*Ph)$) is a non-integer;
  wherein a ratio of the number of rotor slots $S_r$ to the number of rotor poles $P_r$ and the number of electrical phases ($S_r/(P_r*Ph)$) is an integer; and
  wherein a torque ripple of the motor is less than a motor with an equal number of stator slots and rotor slots.

2. The electrical motor according to claim 1, wherein the stator further comprises a plurality of phase windings corresponding to the number of electrical phases Ph, at least one of the phase windings being unsymmetrical relative to the other phase windings, at least one of the stator slots sharing phase windings of two different electrical phases.

3. The electrical motor according to claim 1, wherein the stator further comprises a plurality of pole windings corresponding to the number of stator poles $P_s$, at least one of the pole windings being unsymmetrical relative to the other pole windings, at least one of the stator slots sharing pole windings of two different stator poles.

4. The electrical motor according to claim 1, wherein the number of stator poles $P_s$ is equal to the number of rotor poles $P_r$.

5. The electrical motor according to claim 4, wherein the number of stator poles $P_s$ and the number of rotor poles $P_r$ is four.

6. The electrical motor according to claim 1, wherein the number of stator slots $S_s$ is 27 and the number of rotor slots $S_r$ is 24.

7. The electrical motor according to claim 1, wherein the stator further comprises a plurality of phase windings corresponding to the number of electrical phases Ph, at least one of the phase windings being unsymmetrical relative to the other phase windings, and the stator further comprises a plurality of pole windings corresponding to the number of stator poles $P_s$, at least one of the pole windings being unsymmetrical relative to the other pole windings.

8. The electrical motor according to claim 7, wherein the number of stator poles $P_s$ is equal to the number of rotor poles $P_r$.

9. The electrical motor according to claim 8, wherein the number of stator poles $P_s$ and the number of rotor poles $P_r$ is four.

10. The electrical motor according to claim 9, wherein the number of stator slots $S_s$ is 27 and the number of rotor slots $S_r$ is 24.

11. The electrical motor according to claim 7, wherein at least one of the stator slots shares phase windings of two different electrical phases and at least one of the stator slots shares pole windings of two different stator poles.

12. The electrical motor according to claim 1, wherein the stator further comprises a plurality of pole windings corresponding to the number of stator poles $P_s$, at least one of the pole windings being unsymmetrical relative to the other pole windings, and the number of stator poles $P_s$ is equal to the number of rotor poles $P_r$.

13. The electrical motor according to claim 12, wherein the number of stator poles $P_s$ and the number of rotor poles $P_r$ is four.

14. The electrical motor according to claim 13, wherein the number of stator slots $S_s$ is 27 and the number of rotor slots $S_r$ is 24.

15. The electrical motor according to claim 1, wherein the stator further comprises a plurality of phase windings corresponding to the number of electrical phases Ph, at least one of the phase windings being unsymmetrical relative to the other phase windings, and the number of stator poles $P_s$ is equal to the number of rotor poles $P_r$.

* * * * *